United States Patent [19]
Erdogan et al.

[11] Patent Number: 5,550,654
[45] Date of Patent: Aug. 27, 1996

[54] METHOD FOR FORMING, IN OPTICAL MEDIA, REFRACTIVE INDEX PERTURBATIONS HAVING REDUCED BIREFRINGENCE

[75] Inventors: Turan Erdogan, Berkeley Heights; Victor Mizrahi, Bedminster, both of N.J.

[73] Assignee: Lucent Technologies Inc., Murray Hill, N.J.

[21] Appl. No.: 402,803

[22] Filed: Mar. 13, 1995

Related U.S. Application Data

[63] Continuation of Ser. No. 93,420, Jul. 19, 1993, abandoned.

[51] Int. Cl.$^6$ ............................................. G03H 1/02
[52] U.S. Cl. ........................... 359/3; 359/34; 385/4; 385/10; 385/11
[58] Field of Search ............................ 359/3, 12, 13, 359/15, 34, 566, 7; 356/347; 369/103; 385/11, 27, 28, 4, 10; 372/102

[56] References Cited

U.S. PATENT DOCUMENTS

| | | | |
|---|---|---|---|
| 3,674,336 | 7/1972 | Kogelnik | 359/34 |
| 4,500,168 | 2/1985 | Kajioka et al. | 385/11 |
| 4,707,135 | 11/1987 | Swain et al. | 356/347 |
| 4,725,110 | 2/1988 | Glenn et al. | . |
| 4,807,950 | 2/1989 | Glenn et al. | . |
| 4,950,567 | 8/1990 | Keys et al. | 359/13 |
| 4,993,789 | 2/1991 | Biles et al. | 369/103 |
| 5,007,705 | 4/1991 | Morey et al. | . |
| 5,066,133 | 11/1991 | Brienza | 359/12 |
| 5,104,209 | 4/1992 | Hill et al. | 385/27 |
| 5,105,298 | 4/1992 | Schellenberg | 359/3 |
| 5,161,039 | 11/1992 | Schellenberg | 359/3 |
| 5,218,651 | 6/1993 | Faco et al. | 385/4 |
| 5,225,918 | 7/1993 | Taniguchi et al. | 359/12 |
| 5,307,437 | 4/1994 | Facq et al. | 385/11 |
| 5,313,538 | 5/1994 | Sansonetti | 385/28 |
| 5,327,515 | 7/1994 | Anderson et al. | 359/566 |
| 5,341,444 | 8/1994 | Henry et al. | 385/11 |
| 5,343,550 | 8/1994 | Egalon et al. | 385/11 |
| 5,367,588 | 11/1994 | Hill et al. | 359/569 |

OTHER PUBLICATIONS

G. A. Ball and W. W. Morey, Continuously tunable single–mode erbium fiber laser, *Optics Lett.* 17 (1992) 420–422.

G. Meltz and W. W. Morey, "Bragg Grating Formation and Germanosilicate Fiber Photosensitivity," *SPIE International Workshop on Photoinduced Self–Organization in Optical Fiber*, Quebec City, Canada (May 10–Nov. 1991), SPIE vol. 1516.

K. O. Hill et al, "Birefringent Photosensitivity in Monomode Optical Fibre: Application to External Writing of Rocking Filters," *Elect. Lett.* 27 (1991) 1548–1550.

Ranaswamy et al, "Birefringence in Elliptically Clad Borosilicate Single–Mode Fibers," *Applied Optics*, vol. 18, No. 24, 15 Dec. 1979, pp. 4080 to 4083.

Zheng et al, "Polarization Characteristics of the Fundamental Mode of Optical Fibers," *Journal of Lightwave Technology*, vol. 6, No. 8, Aug. 1988, pp. 1300 to 1305.

*Primary Examiner*—Paul M. Dzierzynski
*Assistant Examiner*—Darren E. Schuberg
*Attorney, Agent, or Firm*—Martin I. Finston; Eugen E. Pacher

[57] ABSTRACT

A method is described for selectively modifying the refractive index of an optically transmissive body having an optical propagation axis. According to this method, polarized, actinic radiation is impinged on at least a portion of the body. In contrast to methods of the prior art, the actinic radiation is at least 60% polarized with a polarization direction parallel to a plane containing the propagation axis.

2 Claims, 5 Drawing Sheets

METHOD FOR FORMING, IN OPTICAL MEDIA, REFRACTIVE INDEX PERTURBATIONS HAVING REDUCED BIREFRINGENCE

This application is a continuation of application Ser. No. 08/093420, filed on Jul. 19 1993 now abandoned.

FIELD OF THE INVENTION

This invention pertains to methods for using actinic radiation to modify the optical properties of optical materials by producing refractive index perturbations having desired characteristics. The invention pertains, in particular, to the application of such methods for manufacturing Bragg gratings in optical waveguiding articles such as optical fibers.

ART BACKGROUND

Certain optical media, including at least some silica-based optical fibers, can be modified by exposure to electromagnetic radiation in an appropriate spectral range. (Ultraviolet radiation is typically used.) That is, exposure of a photosensitive optical fiber (or other optical medium) to appropriate radiation may cause the refractive index to change in the exposed portion of the medium. A periodic pattern can be imposed on the impinging radiation by, e.g., superimposing a pair of beams of substantially monochromatic radiation to create an interference pattern. When such a patterned radiation field impinges on an optical fiber or other optical waveguide having a core of the appropriate photosensitivity, a corresponding pattern is imposed on the core in the form of periodic (or quasiperiodic) fluctuations in the core refractive index. Such a pattern, which is referred herein to as a "Bragg grating," can behave as a spectrally selective reflector for electromagnetic radiation.

A technique for creating these Bragg gratings is described in U.S. Pat. No. 4,725,110, issued to W. H. Glenn, et al. on Feb. 16, 1988, and U.S. Pat. No. 4,807,950, issued to W. H. Glenn, et al. on Feb. 28, 1989. An optical fiber laser having a DBR-terminated cavity is described in G. A. Ball and W. W. Morey, "Continuously tunable single-mode erbium fiber laser," *Optics Lett.* 17 (1992) 420–422.

Bragg gratings are useful, inter alia, as spectral filters. An optical filter which comprises a Bragg grating formed in an optical fiber is described in U.S. Pat. No. 5,007,705, issued to W. W. Morey, et al. on Apr. 16, 1991.

Practitioners in the art have reported that Bragg gratings formed in this manner are anisotropic. That is, an optical signal of a given vacuum wavelength has an effective wavelength within the Bragg grating that is polarization-dependent. As a consequence, the wavelength of maximum reflectivity of the Bragg grating tends to shift as the polarization of a linearly polarized input signal is rotated. The anisotropy of Bragg gratings in optical fibers has been reported, for example, by G. Meltz and W. W. Morey, "Bragg Grating Formation and Germanosilicate Fiber Photosensitivity," *SPIE International Workshop on Photoinduced Self-Organization in Optical Fiber*, Quebec City, Canada (May 10–11, 1991), SPIE Vol. 1516. Such anisotropy has also been reported by K. O. Hill, et at., "Birefringent Photosensitivity in Monomode Optical Fibre: Application to External Writing of Rocking Filters," *Electr. Lett.* 27 (1991) 1548–1550.

However, there are many applications in which signal polarizations are random, and it is consequently desirable for signal-processing components to perform in a manner which is independent of polarization. Practitioners in the art have hitherto failed to provide a technique for forming Bragg gratings in optical fibers (or other waveguiding media) which are isotropic, and therefore suitable for these applications.

SUMMARY OF THE INVENTION

We have discovered a method for forming Bragg gratings, and other articles including patterns of refractive index perturbation, that are isotropic. Thus, the invention in a broad sense involves a method for making an optically transmissive article. The method includes the step of providing a body that comprises a photosensitive, optical material, wherein an optical propagation axis is defined. The method further includes impinging actinic, electromagnetic radiation on at least a portion of the body. The impinged radiation is at least partially polarized. The impinging step is carried out such as to cause a desired pattern of refractive index perturbation to form in the impinged portion of the body. A plane, to be referred to as the "optical plane," is defined by the incident direction of the impinging radiation, and the optical propagation axis of the impinged body. In contrast to methods of the prior art, the impinging radiation is at least 60% polarized in a direction parallel to the optical plane.

DETAILED DESCRIPTION OF A PREFERRED EMBODIMENT

Figure 1:
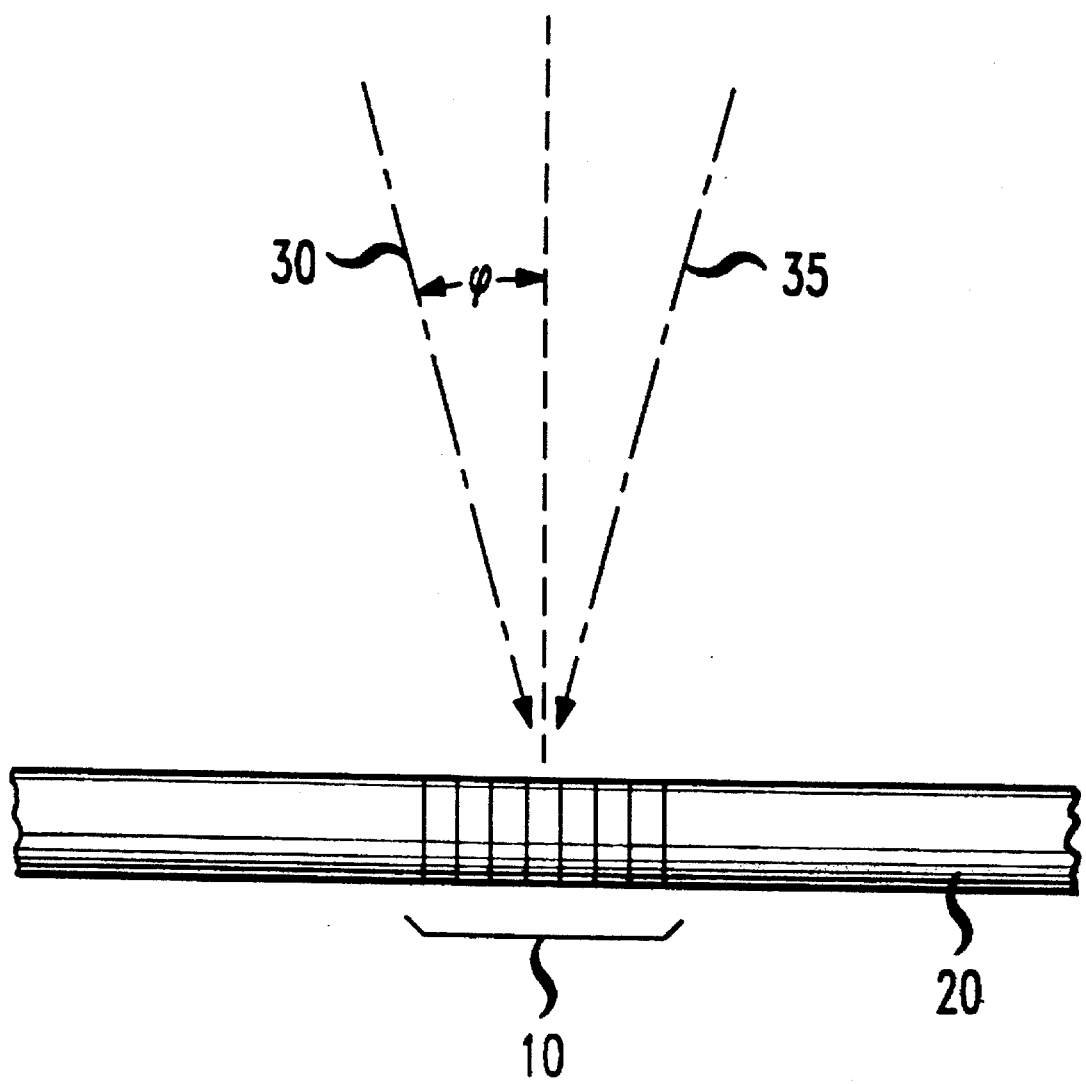
FIG. 1 is a schematic drawing showing the formation of a Bragg grating in an optical medium by impinging thereupon a pair of interfering actinic beams.

As shown in FIG. 1, a Bragg grating 10 is conveniently formed in a body 20 such as an optical fiber, comprising a suitable photosensitive optical medium, by impinging thereupon an interference pattern of actinic radiation. Methods for producing a suitable such interference pattern are well-known and need not be described here. In general, the interfering beams 30, 35 will intersect at a small half-angle φ. The geometrical period of the resulting grating is determined by the actinic wavelength and the value of φ. For example, a grating period of 530 nm is readily produced in a suitable medium by interfering two 242-nm beams at φ=13°.

An alternate method for forming a Bragg grating is to expose the photosensitive medium to an interference pattern created by impinging a single actinic beam on a mask, such as an amplitude mask or a phase mask. A phase mask is a diffractive optical element that modulates the relative phase, rather than the amplitude, of the diffracted wavefronts. A phase mask is exemplarily made by reactive-ion etching of a fused-quartz substrate overlain by a chromium mask that has been patterned by electron-beam lithography. The use of phase masks to fabricate Bragg gratings is described in U.S. Pat. No. 5,327,515, issued on Jul. 5, 1994, D. Z. Anderson et al. The resulting interference pattern is not, strictly speaking, a two-beam interference pattern, since it is generated by a single beam impinging on the phase mask. However, such an interference pattern is also conveniently characterized by an equivalent intersection angle φ.

Figure 2:
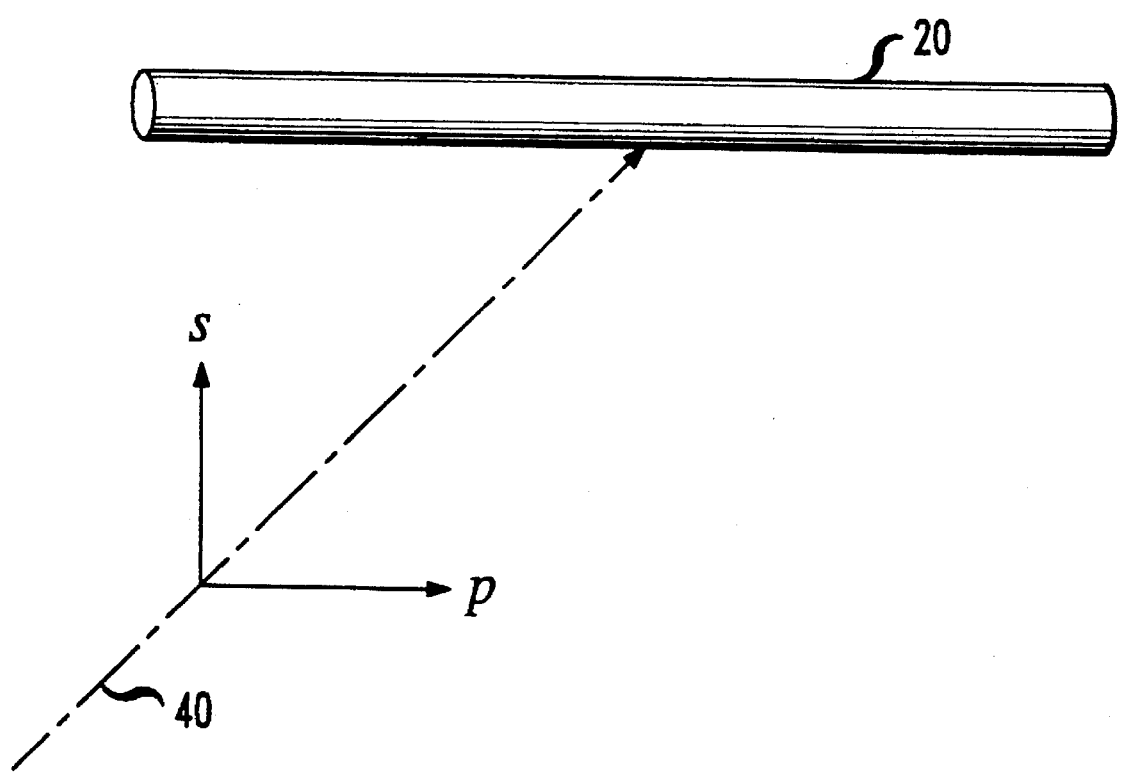
FIG. 2 is a schematic diagram illustrating the distinction between s and p polarization of a beam such as the actinic beams of FIG. 1.

Referring to FIG. 2, the polarization vector of the actinic beam or beams 40 is conventionally directed perpendicular to the optical plane (i.e., the plane that contains the beam or beams and the propagation axis of medium 20). This perpendicular orientation, sometimes referred to as s-polarization, has been generally preferred because it assures that the beams will interfere irrespective of the intersection angle φ. By contrast, the use of beams whose polarization vector lies in the optical plane, sometimes referred to as p-polarized beams, has generally been disfavored. This is because the contrast in the resulting interference pattern will tend to decrease as the angle between p-polarized beams is increased from zero, and the interference pattern will vanish when the beams are perpendicular to each other.

However, when a pair of s-polarized beams is used to form a Bragg grating, the resulting grating will generally exhibit linear birefringence. That is, any given optical signal (of a given vacuum wavelength) propagating in the grating can be resolved into a pair of orthogonal polarization components, each directed along a principal axis. One principal axis is parallel to the s direction, and the other is perpendicular to both the s direction and the propagation axis. In general, these respective components will have different propagation velocities within the grating, and different effective wavelengths within the grating. Correspondingly, the respective refractive indices will also generally be different.

We have discovered that, quite surprisingly, at least some gratings made with p-polarized light do not exhibit this linear birefringence. Instead, we have succeeded in making gratings that are significantly more isotropic with respect to the polarization of optical signals propagating within them. We have further discovered that an interference pattern can be made with adequate contrast, provided the angle φ between the p-polarized beams is not too great. We have successfully used an angle of 13°, and we believe that for some purposes, a useful grating can be made with φ as high as 30° or even more. (At φ=30°, the grating fringes will have a visibility of 50% if they are made using light that is 100% p-polarized.)

We believe that our method will be useful for making isotropic Bragg gratings not only in optical fibers, but also in planar waveguides and in bulk glass optical media. Moreover, isotropy is a useful characteristic of other patterns of refractive index perturbation besides Bragg gratings. For example, it is sometimes useful to modify an optical path length within a medium such as an optical fiber by selectively illuminating a portion of the medium with uniform actinic radiation. This technique is useful, for example, for tuning optical cavities within waveguiding media. (See, e.g., U.S. Pat. No. 5,237,576, issued on Aug. 17, 1993, to D. J. DiGiovanni et al. and entitled "Article Comprising an Optical Fiber Laser.")

We believe that our method is usefully practiced with actinic radiation having p polarization as low as about 60%. By radiation that is "60% polarized" along a given axis, we mean that 60% of the intensity of the radiation will be transmitted by a polarizing filter aligned with the given axis.

EXAMPLE I

We have measured the birefringence associated with the uv-induced refractive index in three different optical fibers. Referred to below as fiber a is the commercially available AT&T Accutether fiber, which has relatively high photosensitivity. Referred to as fiber b is an erbium-doped fiber used for making short, single-mode fiber grating lasers. Referred to as fiber c is a standard AT&T telecommunications fiber having a germanosilicate core. This fiber has relatively low inherent photosensitivity, but it was sensitized by loading it with 3 mol.% molecular hydrogen.

This hydrogen-sensitization technique is described, for example, in U.S. Pat. No. 5,235,659, issued on Aug.10, 1993, to R. M. Atkins et al., and in U.S. Pat. No. 5,287,427, issued on Feb. 15, 1994 to R. M. Atkins et al. Briefly, a silica-based optical fiber or other optical waveguide is exposed to hydrogen gas at a temperature of 250° C. or less and a hydrogen partial pressure of at least 1 atmosphere. Actinic irradiation of the resulting hydrogenated waveguide can result in a normalized refractive index change of $10^{-3}$ or more, and even as high as $10^{-2}$ or more. For example, tests have showed that the the standard AT&T fiber referred to above is readily sensitized by exposing it for 48–72 hours to 14.7 MPa of hydrogen at 75° C. In these tests, ultraviolet irradiation of the hydrogenated fiber produced a normalized index change of $1.8\times10^{-3}$.

The numerical aperture NA of each of the exemplary fibers and the germanium oxide content [$GeBO_2$] of the core of each fiber were: fiber a, NA=0.21, [$GeBO_2$]=9 mol.%; fiber b, NA=0.27, [$GeBO_2$]=14 mol.%; fiber c, NA=0.13, [$GeBO_2$]=3 mol.%. The source of actinic radiation was a frequency doubled dye laser pumped by a XeF excimer laser. This source emitted 15-ns pulses of 242-nm radiation at a repetition rate of 30 Hz. The time-average profile of the emitted beam was approximately Gaussian. For making Bragg gratings, an interferometer was used to divide the output laser beam into a pair of interfering beams. The birefringence of the uv-irradiated fibers was measured using a Hewlett Packard 8509B polarization analyzer at a wavelength of 1530 nm.

The birefringence of the fiber can be described in terms of the maximum absolute difference Δn between the refractive indices corresponding to polarization vectors along the respective principal axes, and a convenient length L that gives a measure of the length of the exposed region. The length L is defined such that $$L = \frac{1}{\Delta n} \int_{-\infty}^{\infty} \Delta n'(z) dz, \quad (1)$$

where Δn' (z) is the distribution of birefringence along the fiber axis, and has a maximum value Δn. In the case of a grating, Δn corresponds to the maximum value of the distribution Δn' (z) spatially averaged over a grating period. We have observed that during actinic exposure, the birefringence Δn' (z) generally grows in approximate proportion to the total refractive index change induced by the exposure. As a result, it is convenient to describe the ultraviolet-induced index change in terms of its maximum value $\delta n_{uv}$ and the above-mentioned length L, according to $$L = \frac{1}{\delta n_{uv}} \int_{-\infty}^{\infty} \delta n'_{uv}(z) dz, \quad (2)$$

where $\delta n_{uv}(z)$ is the distribution of total induced index change, with maximum value $\delta n_{uv}$. As with the birefringence, $\delta n_{uv}$ corresponds to the maximum value of the distribution $\delta n_{uv}(z)$ spatially averaged over a grating period in the case of a grating. For example, for a Gaussian distribution with peak values $\Delta n_{peak}$ and $\delta n_{uv,peak}$, and a full width at half maximum (FWHM) given by $L_{FWHM}$, we obtain:

$$\Delta n = \Delta n_{peak}; \delta n_{uv} = \delta n_{uv,peak}; \text{ and} \quad (3)$$

$$L = L_{FWHM} \times \frac{1}{2} \sqrt{\frac{\pi}{\ln 2}}.$$

It is useful to define a relative birefringence $\eta$ by:

$$\eta = \frac{\int_{-\infty}^{\infty} \Delta n'(z) dz}{\int_{-\infty}^{\infty} \delta n'_{uv}(z) dz} \times 100\%, \quad (4)$$

where $\eta$ is independent of L. The relative birefringence may then be written in terms of maximum values as $$\eta = \frac{\Delta n}{\delta n_{uv}} \times 100\%. \quad (5)$$

We have estimated, for a particular set of equivalent exposure conditions, a $\delta n_{uv}$ of $2.2 \times 10^{-4}$ for fiber a, $5.6 \times 10^{-4}$ for fiber b, and $2.6 \times 10^{-3}$ for fiber c. Exposure with s polarized light produced an $\eta$ of 8% in fiber a, and an $\eta$ of 5% in fiber b. This exemplary exposure was carried out by uniform, normal-incidence illumination. A single beam with an average optical power of 30 mW was focused to a spot size of 50 μm×6 mm. The fluence per pulse was 330 mJ–cm$^{-2}$.

Figure 3:
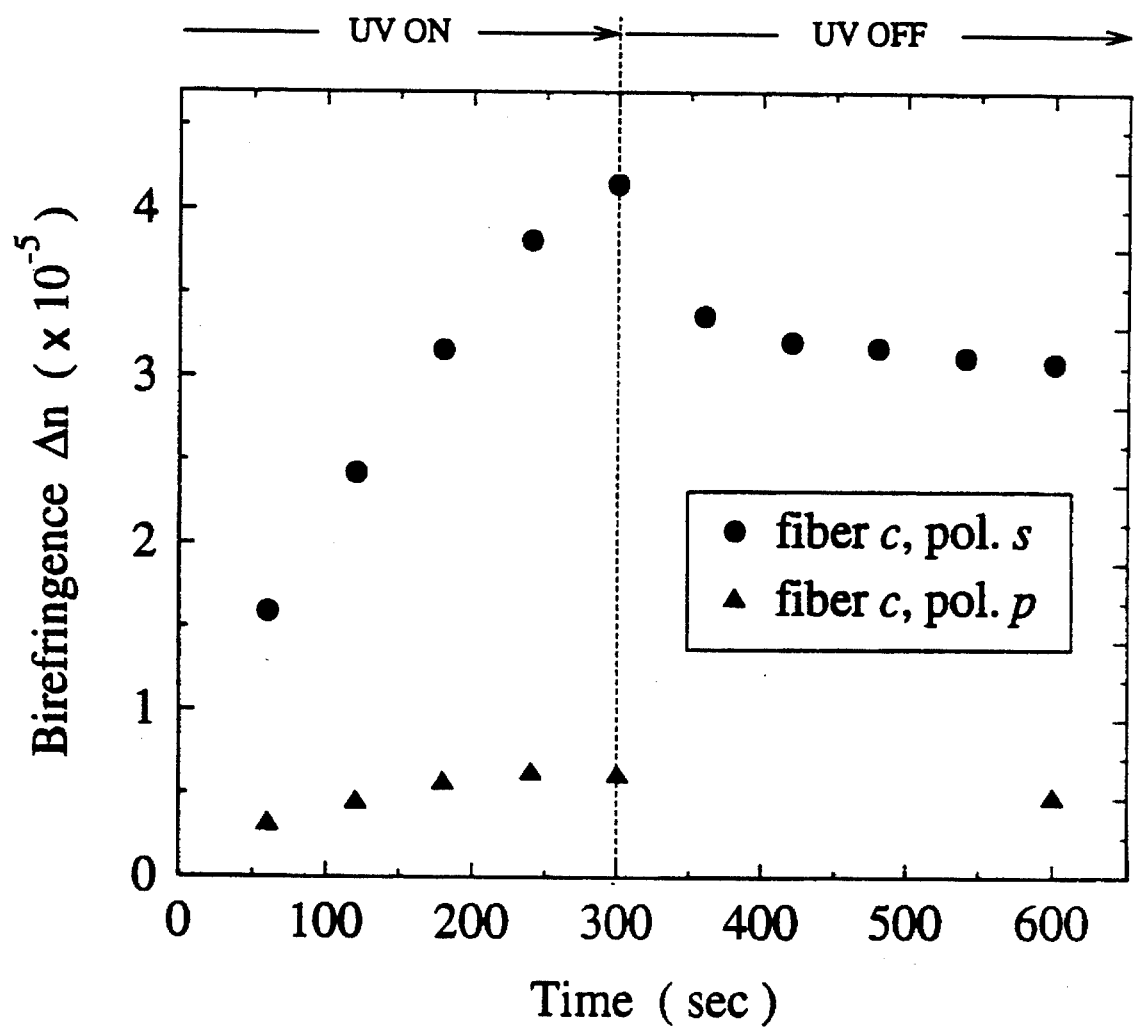
FIG. 3 is a graph of the growth of birefringence in an illustrative optical fiber subjected to actinic irradiation.

FIG. 3 is a graph of the measured growth of birefringence in fiber c during exposure according to the exemplary conditions described above. As indicated, one of the curves in the figure represents exposure with s polarized light, and the other curve represents exposure with p polarized light. In each case, we shut off the ultraviolet illumination after a 300-second exposure, but continued to make measurements of birefringence for a further 300 seconds, during which the uv-induced birefringence was observed to decay to a steady-state value. We found that the ratio $\Delta n_s/\Delta n_p$ of the birefringence produced by s polarized light to that produced by p polarized light was about 6. For s polarization, $\eta$ was 1.2%, and for p illumination, $\eta$ was 0.2%.

It should be noted that the respective ultraviolet exposures of fiber c samples were carried out with an extinction ratio of desired to undesired polarization of only about 10:1 (i.e., about 90% p-polarization). Even with such relatively low selectivity, however, we obtained a relatively large reduction in birefringence by going from substantially s polarized to substantially p polarized light.

EXAMPLE II

Figure 4:
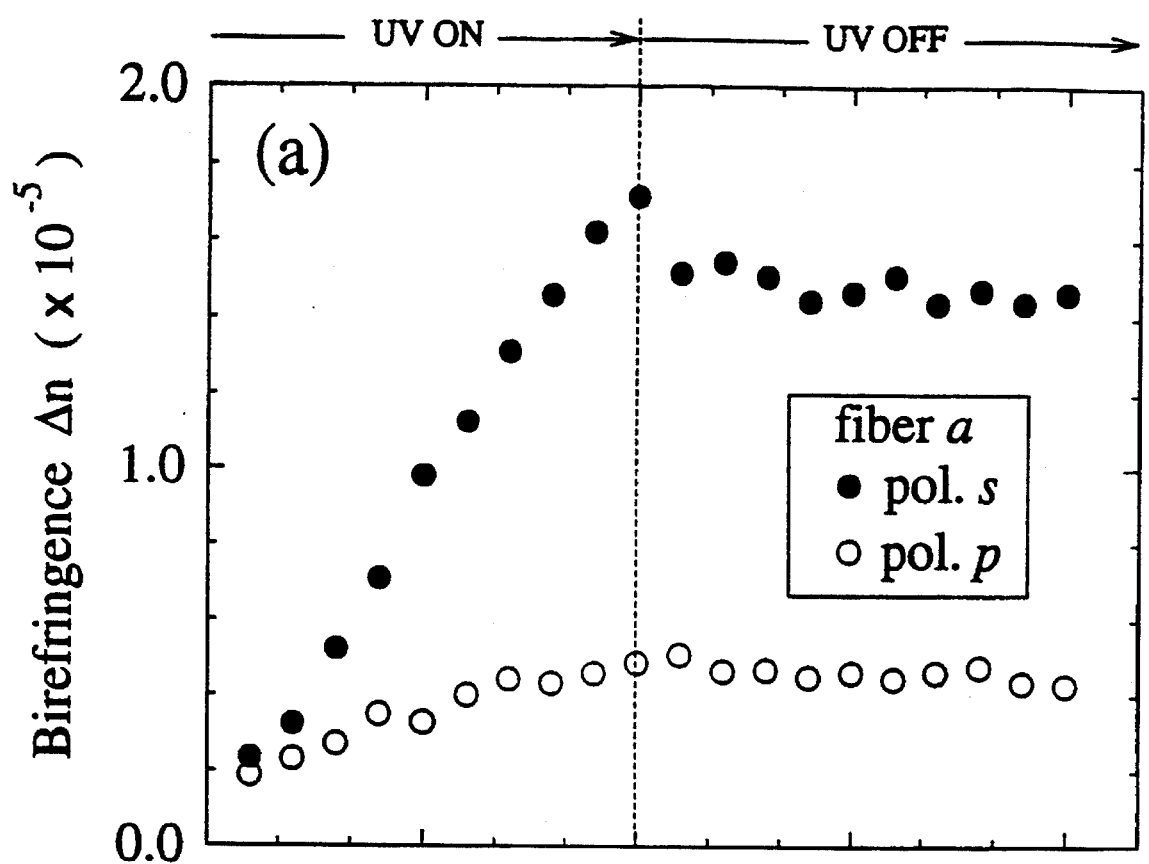
FIGS. 4 and 5 are graphs of the growth of birefringence during the formation of Bragg gratings by actinic irradiation of optical fibers of different compositions.
Figure 5:
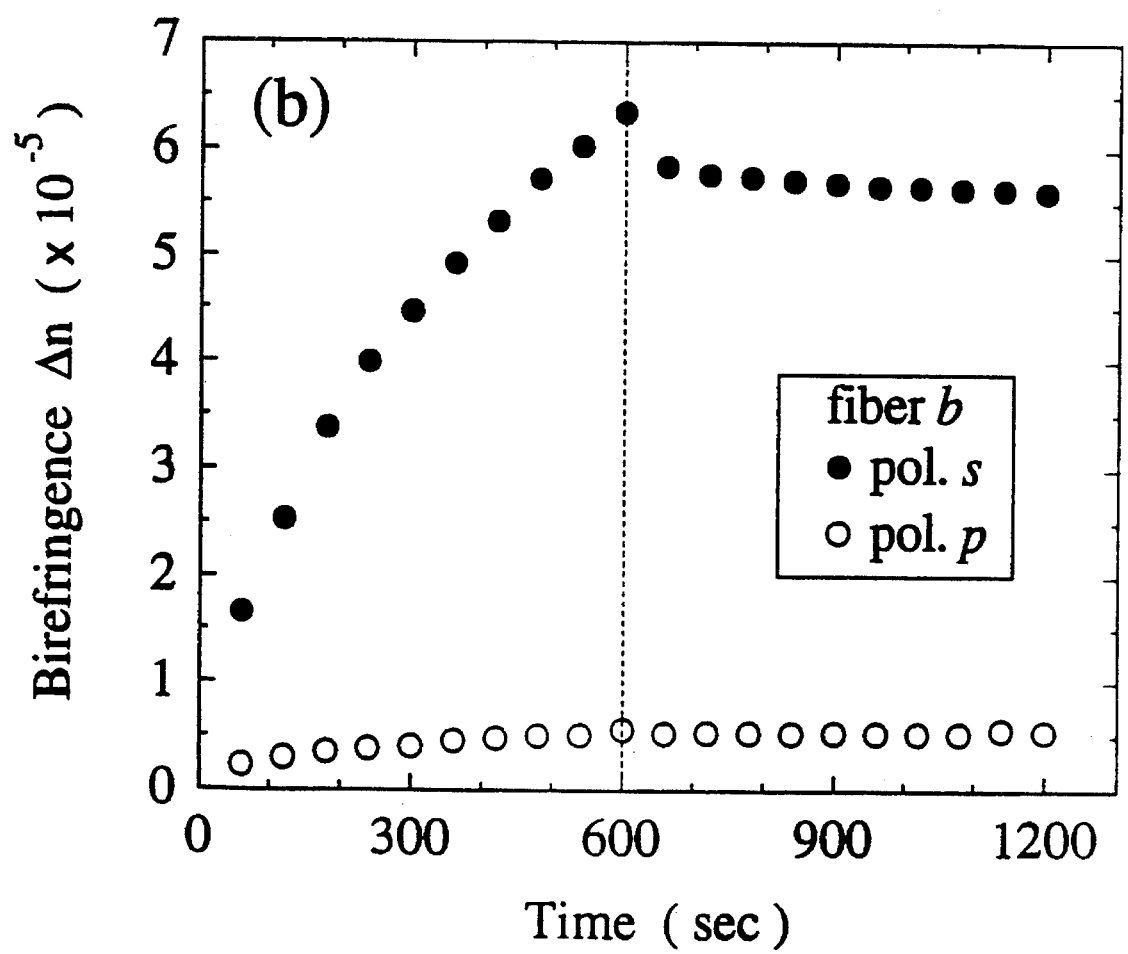

FIG. 4 is a graph showing the growth of birefringence during the formation of Bragg gratings in samples of fiber a by ultraviolet exposure with s polarized and p polarized light, respectively. FIG. 5 is a similar graph showing the growth of birefringence during comparable exposures of samples of fiber b. As in Example I, a total average power of 30 mW was used for these exposures. The polarization extinction ratio was somewhat greater than 25:1 (i.e., about 96% p-polarization). The angle $\phi$ was 13°.

For fiber a, we measured $\Delta n_s/\Delta n_p=3$, and for fiber b, we measured $\Delta n_s/\Delta n_p=10$.

We claim:

1. A method for writing a Bragg grating in a portion of a silica-containing optical fiber, comprising:

generating a beam of actinic radiation;

processing the beam to form a two-beam interference pattern having a sequence of fringes; and exposing the fiber portion to the interference pattern such that at least some of said fringes fall on said portion and said portion is thereby impinged by impinging radiation, wherein said impinging radiation is at least 90% polarized with a P polarization relative to the fiber portion.

2. The method of claim 1, wherein the processing step comprises impinging the beam upon a phase mask such that the beam is diffracted by the phase mask.

* * * * *